United States Patent
Hilger et al.

(10) Patent No.: US 6,845,746 B2
(45) Date of Patent: Jan. 25, 2005

(54) INTERNAL COMBUSTION ENGINE WITH INJECTION OF GASEOUS FUEL

(75) Inventors: Ulrich Hilger, Essen (DE); Bernd Bartunek, Monheim (DE)

(73) Assignee: Westport Germany GmbH, Dortmund (DE)

(*) Notice: Subject to any disclaimer, the term of this patent is extended or adjusted under 35 U.S.C. 154(b) by 0 days.

(21) Appl. No.: 10/418,721

(22) Filed: Apr. 15, 2003

(65) Prior Publication Data

US 2004/0011323 A1 Jan. 22, 2004

Related U.S. Application Data

(63) Continuation-in-part of application No. PCT/EP01/12182, filed on Oct. 22, 2001.

(51) Int. Cl.$^7$ .............................. F02B 3/02; F23Q 7/00
(52) U.S. Cl. ...................... 123/298; 123/145; 123/299; 123/305
(58) Field of Search ......................... 123/143 B, 145 A, 123/260, 261, 298, 299, 305, 446, 486, 527, 568.12, 568.21

(56) References Cited

U.S. PATENT DOCUMENTS

| | | | | |
|---|---|---|---|---|
| 3,703,886 A | * | 11/1972 | Witzky ........................ | 123/256 |
| 4,627,405 A | | 12/1986 | Imhof et al. ................. | 123/549 |
| 4,721,081 A | | 1/1988 | Krauja et al. ................ | 123/298 |
| 4,787,349 A | | 11/1988 | Hilger ......................... | 123/297 |
| 5,146,881 A | * | 9/1992 | Pfefferle ..................... | 123/145 A |
| 5,329,908 A | | 7/1994 | Tarr et al. ................... | 123/527 |
| 6,076,493 A | * | 6/2000 | Miller et al. ............... | 123/145 A |
| 6,298,829 B1 | | 10/2001 | Welch et al. ................ | 123/467 |
| 6,640,773 B2 | * | 11/2003 | Ancimer et al. ............. | 123/299 |

FOREIGN PATENT DOCUMENTS

| | | | | |
|---|---|---|---|---|
| DE | 3038649 | | 1/1984 | |
| DE | 3631473 | | 11/1988 | |
| DE | 4243964 | | 6/1994 | |
| DE | 010052336 | A1 * | 5/2002 | .......... F02B/43/00 |
| EP | 0371759 | | 6/1990 | |
| EP | 0916830 | | 5/1999 | |
| JP | 09159169 | | 6/1997 | |
| JP | 2000291495 | | 10/2000 | |

* cited by examiner

Primary Examiner—Tony M. Argenbright
(74) Attorney, Agent, or Firm—McAndrews, Held & Malloy, Ltd.

(57) ABSTRACT

An internal combustion engine comprises a fuel injection nozzle for injecting a gaseous fuel directly into the combustion chamber. Installed in close proximity to the fuel injection nozzle is an ignition device, comprising a sleeve that provides a shielded space around a hot surface igniter. The sleeve restricts flow between the shielded space and the combustion chamber. An inlet opening in the sleeve allows air and fuel to enter the shielded space to form a combustible mixture therein. The sleeve contains a substantial amount of the combustible mixture within the shielded space until it ignites and pressure builds within the shielded space to propel a combustion flame through at least one discharge opening that is oriented to direct the combustion flame into contact with the fuel spray roots emerging from the fuel injection nozzle.

66 Claims, 2 Drawing Sheets

INTERNAL COMBUSTION ENGINE WITH INJECTION OF GASEOUS FUEL

CROSS-REFERENCE TO RELATED APPLICATION(S)

This application is a continuation-in-part of International Application No. PCT/EP01/12182, having an international filing date of Oct. 22, 2001, entitled, "Internal Combustion Engine With Injection of Gaseous Fuel". International Application No. PCT/EP01/12182 claimed priority benefits, in turn, from German Patent Application No. 10052336.6 filed Oct. 22, 2000. International Application No. PCT/EP01/12182 is hereby incorporated by reference herein in its entirety.

TECHNICAL FIELD

The invention relates to an apparatus and method for operating a gaseous-fueled internal combustion engine that comprises a fuel injection nozzle with a nozzle disposed in a combustion chamber for injecting gaseous fuel directly into the combustion chamber. An ignition device, also disposed within the combustion chamber, is installed in close proximity to the fuel injection nozzle. The ignition device comprises a sleeve that provides a shielded space around a hot surface igniter. The sleeve restricts flow between the shielded space and the combustion chamber to prevent excessive cooling of the igniter between combustion events while allowing a combustible mixture to form within the shielded space until it ignites. The sleeve also allows pressure to build within the shielded space to a level sufficient to propel a combustion flame into the combustion chamber to ignite the charge therein.

BACKGROUND

Liquid-fueled internal combustion engines have been used to produce power and drive machines for over a century. From the beginning, internal combustion engines have undergone many improvements to become more efficient, more powerful, and/or less polluting. To assist with these improvements, fuel properties and quality have also improved, and alternative fuels such as methanol and other alcohol-based fuels have also been considered to help with reducing harmful emissions. However, compared to such liquid fuels, an equivalent amount of a combustible gaseous fuel, such as methane, hydrogen, natural gas, and blends of such fuels, with equivalence measured on an energy basis, can be combusted to produce the same power while producing less harmful emissions in the form of particulates and greenhouse gases.

However, a problem with replacing liquid fuel with such gaseous fuels in a conventional internal combustion engine has been that such gaseous fuels typically do not ignite as readily as liquid fuels. There are also many other differences that result when a gaseous fuel is substituted for a liquid fuel. For example, the combustion strategy may be different to account for longer ignition delays associated with a gaseous fuel, or a longer time may be required to inject a gaseous fuel into the engine. In addition, the fuel supply system and the manner of introducing the fuel into the engine typically require equipment specialized for handling gaseous fuels. Furthermore, the selected combustion strategy may dictate a different geometry for the combustion chamber. Accordingly, a design suitable for a liquid-fueled engine may not be suitable for a gaseous-fueled engine without considerable modifications, which can influence commercial viability.

Gaseous-fueled engines currently used in commercial vehicles operate using the Otto cycle with homogeneous mixture formation, spark ignition, and throttle control, and these engines are predominantly derived from modified diesel-cycle engines, because of the power and torque required for commercial vehicles. For example, the mixture forming process, modified from that of diesel-cycle engines, as well as the use of spark ignition, are aspects that require respective modifications of the intake system and the cylinder head. The modified combustion process also necessitates a modified combustion chamber recess in the piston. Engine manufacturers usually make efforts to keep the number of engine components that need to be modified for gaseous fuel operation as low as possible. This is an attempt to limit the additional manufacturing costs for adapting engines to use gaseous fuel, if possible, while maintaining the durability and long service life that operators of conventionally-fueled engines have become accustomed to for their commercial vehicles.

For gaseous-fueled internal combustion engines, one of the predominant combustion processes operates with stoichiometric fuel-air mixtures in combination with a three-way catalytic converter. Initially demand for gaseous-fueled engines in commercial vehicles was based on the desire for low-emission characteristics, with efficiency and fuel consumption characteristics being secondary considerations. The admixture of gaseous fuel typically takes place through a gaseous fuel mixer, arranged in the center of the intake system, with electronically controlled gaseous fuel supply. More recent gaseous fuel systems have switched to multi-point injection in front of the intake valve of each cylinder, to be able to improve equi-distribution of the mixture and to maintain a stoichiometric mixture composition during non-stationary engine operation. In order to maintain the stoichiometric ($\lambda=1$) fuel-air mixture, a 'closed-loop' air/fuel ratio control known from gasoline engines can be employed. The compression ratio is generally limited to values between 11:1 and 11.5:1 to ensure a sufficient safety margin against knocking.

The performance that can be achieved by non-supercharged engines with stoichiometric control is approximately 5% below that of naturally aspirated liquid-fueled diesel-cycle engines, caused by the decreased air volume drawn in by the engine, which results from the addition of the gaseous fuel into the intake pipe. Compared to today's supercharged liquid-fueled diesel-cycle engines, gaseous-fueled Otto cycle engines produce up to 15% less power, taking into account the effect of the higher thermal loads associated with Otto cycle engines. This loss in power already takes into account that the use of exhaust gas recirculation with EGR rates of up to 15% can reduce the thermal load. The only way to completely compensate for the lower performance of Otto cycle engines is to increase the displacement.

The fuel economy of stoichiometrically-controlled gaseous fuel engines is characterized by an energy consumption that is 15 to 20% higher in stationary 13 mode tests than that of comparable diesel engines. When operating frequently under low load, as is typical for buses operating in cities, the throttle control has been found to be responsible for an increase in fuel consumption of above 40%.

The disadvantages with respect to power and fuel economy of stoichiometrically-controlled gaseous-fueled engines, in comparison to today's liquid-fueled diesel cycle engines, can be significantly reduced by employing lean-mix engine concepts. Mixture formation usually takes place downstream of the turbo charger in an electronically controlled fuel-air mixer centrally located in the intake system. For compression ratios between 11:1 and 11.5:1, the lean-mix engine as a rule possesses a combustion chamber geometry similar to those of stoichiometrically-controlled engines. Since leaner natural gas fuel-air mixtures lead to a strongly decreasing rate of combustion, a suitable adjustment of, for example, the squish flow is necessary to counteract a prolonged combustion process with accordingly higher hydrocarbon emissions. Air ratios achievable by today's lean-mix engines are not higher than $\lambda=1.5$ for high engine loads and thus higher rates of combustion. At low engine loads, the combustion temperature is lower and the ability to operate on a lean mixture is thus limited to $\lambda$ values between 1.1 and 1.3.

Since thermal stresses on components of lean-mix engines are lower than those in stoichiometrically-controlled gaseous fuel engines, it becomes possible to significantly increase the boost pressure, so that in combination with charge-air cooling one can achieve effective average pressures of up to 14 bar. The torque band to a large extent corresponds to that of a large number of commercially available liquid-fueled diesel-cycle engines. However, lean-mix engines still may suffer from significant power disadvantages in comparison to the power levels achieved by Euro 3 type liquid-fueled diesel cycle engines.

Since the ability to operate today's lean-mix engines on even leaner mixes is limited, especially in the lower partial load range, to $\lambda$ values of 1.2 to 1.4, due to the slow rate of combustion of natural gas, these engines also require throttle control. Accordingly, the ECE R49 emission test determines fuel consumption rates that are, depending on the engine design, more than 15% higher than those of comparable liquid-fueled diesel cycle engines. For example, during everyday operation of a city bus, this results in fuel consumption values that are up to 30% higher because of the large proportion of operating time when the engine operates under idle or low load conditions.

Lean-mix concepts for natural gas engines aimed at meeting the new Euro 4 emission standards coming into effect in 2005 will be characterized by further developments of existing lean-mix engine concepts aimed at a broadening of the limits of lean-mix operation to be able to reduce NOx emission values below the limit of 3 g/kWh.

For this purpose, combustion processes are being developed that are characterized by a more intensive cylinder charging movement, to compensate for the strongly decreasing rate of combustion of very lean mixtures with a relative air/fuel ratio of up to 1.6 at operating points close to full load. Lean-mix engines of this type possess combustion processes with increased ability to run on lean mixtures and also are equipped with exhaust turbo-charging and charge-air cooling. Depending on the design, the compression ratio lies between 11.7:1 and 13:1. Such designs should be able to achieve NOx values in the ECE R49 emission test of between 1.5 g/kWh and 2 g/kWh, given hydrocarbon values upstream of the catalytic converter of approximately 2.9 g/kWh.

Due to the higher compression ratio and the lean mixture under full load, the maximum engine efficiency can be increased up to a value of 40%. Consequently, in an ECE R49 test cycle, the fuel consumption values should only be 5% to 15% higher than those of future liquid-fueled diesel cycle engine designs for the Euro 4 emission standard. Depending on the design of the turbo charger, the achievable mean pressure may reach a maximum effective mean pressure of 14 bar to 18 bar.

In addition to developments in the area of homogeneous lean-mixture processes, recent efforts have been directed to processes with high-pressure gaseous fuel injection directly into the combustion chamber of an unthrottled engine. Such engines can employ a compression ratio similar to those employed in liquid-fueled diesel cycle engines because knocking is not a problem. For example with this type of engine, a compression ratio of between 16:1 and 18:1 can be employed. An advantage of this approach is that the low emission levels achievable with a gaseous-fueled engine can be combined with the significantly higher efficiency levels normally only associated with liquid-fueled diesel-cycle engines.

U.S. Pat. No. 5,329,908 discloses a compressed natural gas injection system for gaseous-fueled engines. The fuel injection nozzle is operated so that during the injection process the gaseous fuel spreads as a cloud into the combustion chamber recess through an annular discharge opening being formed during the injection process. During this process, part of the cloud comes into contact with an ignition plug and the fuel-air mixture within the combustion chamber is ignited at the ignition plug. One of the described embodiments uses a constant pressure gas supply and a conventional glow plug serves as the ignition plug. A fuel supply unit is described for ensuring that the gaseous fuel can be supplied to the fuel injection valves with a pressure that is high enough to introduce the fuel into the combustion chamber when the piston is near top dead center. This engine operates in a high efficiency mode that achieves efficiencies like those of a liquid-fueled diesel-cycle engine. However, conventional glow plugs like those used in diesel engines are designed to provide ignition assistance only during start-up because diesel fuel readily auto-ignites at the pressures and temperatures normally present in a diesel engine once it is running. With gaseous fuels like natural gas, which do not auto-ignite as readily as diesel, with the disclosed arrangement an ignition plug may be needed to continuously provide ignition assistance to initiate combustion. Continuous activation of a conventional glow plug, which is only designed for brief use during start up, can lead to early failure. Experiments have shown that the length of a glow plug's service life generally decreases as operating temperature increases, and that conventional glow plugs can not be relied upon to provide the durability that operators of gaseous-fueled internal combustion engines are expected to demand.

U.S. Pat. No. 4,721,081 is directed towards a glow plug shield with thermal barrier coating and ignition catalyst, which purports to extend the service life of a glow plug that is used to ignite fuels that are not auto-ignitable. In the background discussion provided by the '081 patent, it is noted that it is known to provide protective tubular shields of metal or ceramic circumferentially surrounding a glow plug along its length. Further, that it is also known to protect a silicon nitride glow plug by coating the plug with a refractory metal oxide and to provide the glow plug with a combustion promoting catalyst so that the glow plug temperature may be reduced. The improvements added by the '081 patent includes a shield that has an oblique open end that exposes the glow plug in the direction of the fuel injector, while providing a solid physical barrier in the direction of the intake valves. The '081 patent further discloses coating the interior and exterior of the shield with a ceramic refractory material, such as a metal oxide that acts as a thermal barrier so that the shield reduces the cooling effect of the inlet gas on the glow plug and also reduces the electrical power needed by the glow plug to maintain a surface temperature suitable for sustaining good combustion. According to the '081 patent, to further reduce the required glow plug temperature and extend glow plug life, a combustion catalyst may be incorporated into the coating.

There is a need for a gaseous-fueled internal combustion engine that can match the performance, efficiency, reliability, and durability of an equivalent liquid-fueled diesel-cycle engine, while producing lower amounts of harmful emissions such as particulate matter and nitrogen oxides. Such an engine can play a major role in the improvement of air quality, especially in highly populated areas where presently there is concentrated use of liquid-fueled diesel-cycles engines and where gaseous fuels such as natural gas can be easily distributed.

SUMMARY

A method and apparatus is provided for injecting gaseous fuel into the combustion chamber of an unthrottled high compression engine. For example, in an engine with a compression ratio of between 16:1 and 18:1, the gaseous fuel can be injected at a high pressure of approximately 200 bar, towards the end of the compression stroke. This results in the formation of an inhomogeneous fuel-air mixture, similar to that found in a diesel engine. A high-speed gaseous fuel injection valve is employed to inject the gaseous fuel into the combustion chamber. The combustion chamber is defined by a cylinder, a piston that is reciprocable within the cylinder, and a cylinder head covering one end of the cylinder. The combustion chamber can be further defined in part by a piston bowl or recess formed in the piston head (which is the end surface of the piston that faces the combustion chamber). Using the present method and operating with a compression ratio substantially the same as that of an equivalent diesel engine, it is possible to reduce the modifications required for natural gas operation and to reduce manufacturing costs, by shaping the combustion chamber so that it corresponds largely to the geometry of combustion chambers found in conventional diesel engines.

Due to the insufficient ability of gaseous fuels such as natural gas to reliably self-ignite in an internal combustion engine, ignition of the fuel-air mixture is ensured by a method comprising:

introducing a gaseous fuel into the combustion chamber by means of a plurality of fuel sprays released into the combustion chamber from a fuel injection valve disposed within the combustion chamber;

directing one of the fuel sprays to an impingement point on a sleeve that surrounds an igniter so that a portion of the gaseous fuel flows through an intake opening provided in the sleeve, whereby the gaseous fuel mixes with air in a shielded space provided between the igniter and the sleeve to form a combustible fuel-air mixture next to the igniter;

igniting the combustible fuel-air mixture by heating a surface of the igniter to a temperature that causes ignition of the combustible fuel-air mixture; and restricting fluid flow between the combustion chamber and the shielded space and retaining a substantial portion of the combustible fuel-air mixture within the shielded space until combustion of same increases pressure within the shielded space to a magnitude that propels a burning fuel-air mixture therefrom, through at least one discharge opening and into contact with roots of the plurality of fuel sprays in the combustion chamber near the fuel injection valve.

A preferred embodiment of the method further comprises injecting the gaseous fuel into the combustion chamber at a first flow rate when the engine is operating at low load or idle, and injecting the gaseous fuel into the combustion chamber at a second flow rate when the engine is operating at high load, wherein the second flow rate is higher than the first flow rate.

To further improve combustion stability and engine efficiency, the method can further comprise controlling the flow rate so that for expected operating conditions the desired fuel quantity of the gaseous fuel can be injected into the combustion chamber by an injection event that has a duration that is longer than an ignition delay associated with the ignition of the gaseous fuel that was directed towards the igniter at the beginning of the injection event. In this way, the duration of an injection event is controllable so that a combustible fuel-air mixture is provided near the fuel injection valve where it can be ignited by the burning fuel-air mixture propelled from the shielded space, even during low load and idle conditions. Injection timing and injection event duration are preferably controlled as a function of measured engine operating conditions and by referring to an electronic engine map.

Another preferred method comprises introducing the gaseous fuel into the combustion chamber in a plurality of injection events during a single engine cycle. For example, a first injection event can be employed to introduce a first quantity of the gaseous fuel into the combustion chamber to be ignited by the igniter, followed by at least one other injection event to introduce a second quantity of the gaseous fuel. The first and second quantities of fuel together provide a total quantity of fuel that is equal to a desired amount determined by an engine controller, with reference to an engine map. The first quantity of fuel can be determined by the engine controller to be a quantity that is sufficient to ensure that the second quantity of fuel is ignited. The timing for the first injection event is preferably governed by the desired ignition timing and the timing for the second injection event can be governed by the timing that will result in the desired combustion characteristics.

In an example of this method, an ignition quantity of fuel that represents 5% to 10% of the fuel quantity needed at full load is introduced into the combustion chamber by the first injection event. The second injection event is employed to inject a main quantity of fuel into the combustion chamber to supplement the ignition quantity of fuel to provide the amount of fuel required to satisfy the demanded engine load, as determined by the engine controller by referring to an engine map. In this example, the two separate fuel injection events can be timed to provide more intensive and thus more stable ignition of the fuel-air mixture without an increase in the surface temperature of the igniter, a prerequisite for lower emissions of carbon monoxide and unburned fuel. In addition, because some of the fuel is introduced during the first injection event, this results in a smaller ignitable mixture volume when combustion begins, which leads to a lower heat release rate and thus less combustion noise.

This method can further comprise dividing the main injection quantity into a plurality of individual injection events with the number of injection events limited only by the actuation capabilities of the fuel injection valve. With this approach one can control the spatial and time distribution of the fuel-air mixture in the combustion chamber, which can be especially advantageous for the overall combustion process as well as the surface ignition process. Preferably, and especially at the beginning of the combustion event, the burning fuel-air mixture emerging from the ignition device is propelled rapidly into the combustion chamber. During the later course of the fuel injection process, an increase of the injected fuel volume and mass, under stable combustion conditions, makes it possible to achieve a shortening of the total combustion time, which is advantageous for obtaining a high thermal efficiency.

This aspect of the method, which relates to employing a plurality of injection events, can be combined with controlling flow rate and injection event duration for additional control over the combustion process.

In preferred embodiments, the igniter is electrically heated. Another feature that can be incorporated into the present method comprises controlling the electrical heating energy delivered to the igniter depending upon the engine's operating conditions. That is, the method can further comprise controlling the temperature of the igniter as a function of a measured operating parameter of the engine. For example, when high load conditions are detected, the higher combustion chamber temperatures can provide heat to the igniter and reduce the requirements for electrical heating energy. Reducing the electrical heating energy that is delivered to the igniter under such conditions can result in a significant increase in the service life of the igniter.

On the other hand, at low engine load, with the associated lower combustion chamber temperature, and at high engine speeds and low engine load, the igniter is subject to a greater heat loss, which can be compensated for by increasing the electrical power to the igniter. If such conditions are not compensated for, misfire or longer ignition delays can result, causing among other things, lower efficiency and higher emissions of unburned fuel.

A combustion catalyst coating can also be disposed on the igniter and/or sleeve so that the igniter temperature can be reduced to increase service life and reduce power required to heat the igniter. The catalytic coating can be disposed on the sleeve or on the igniter itself.

For practicing the disclosed method an internal combustion engine that can be fueled with a combustible gaseous fuel is disclosed herein. This internal combustion engine comprises:

at least one combustion chamber defined by a cylinder, a piston reciprocable within the cylinder, and a cylinder head that covers an end of the cylinder;

an ignition device with an end disposed within the combustion chamber, the ignition device comprising an igniter that is heatable to provide a hot surface and a sleeve surrounding the igniter, the sleeve defining a shielded space between the igniter and the sleeve;

a fuel injection valve disposed within the combustion chamber, the fuel injection valve being operable to introduce the combustible gaseous fuel into the combustion chamber with a plurality of fuel sprays each released from one of a plurality of fuel injection ports, wherein one of the plurality of fuel injection ports is oriented to direct a fuel spray, referred to as an ignition fuel spray, towards an impingement point on the sleeve;

an intake opening provided through the sleeve near the impingement point connecting the shielded space to the combustion chamber whereby, when the ignition fuel spray impacts the impingement point, a portion of the combustible gaseous fuel contained within the ignition fuel spray passes through the intake opening and into the shielded space;

a discharge opening provided through the sleeve, spaced further from the impingement point than the intake opening, wherein the discharge opening is oriented to direct a burning fuel-air mixture from the shielded space and towards roots of the plurality of fuel sprays near the fuel injection valve; and wherein the sleeve restricts flow between the shielded space and the combustion chamber so that a substantial portion of the combustible gaseous fuel is retained within the shielded space until combustion of the combustible gaseous fuel within the shielded space produces a pressure therein that is higher than the pressure within the combustion chamber and the pressure is high enough to propel the burning fuel-air mixture into the combustion chamber and into contact with the roots of the plurality of the fuel sprays.

In preferred embodiments, the engine is operable with a compression ratio up to 25:1, and more preferably between 13:1 and 25:1. An engine with a variable compression ratio can be employed to change the compression ratio based upon an operating parameter such as engine load. For example, at low loads, a higher compression ratio can be employed to increase in-cylinder temperature at the end of the compression stroke to improve the combustion process and reduce the quantity of unburned hydrocarbons exhausted from the engine. At higher loads a reduced compression ratio can be employed to allow for a reduced peak cylinder pressure and lower combustion noise. With such a method, the thermal efficiency of the engine can be increased.

The size of the fuel injection valve's fuel injection ports are determined by the flow cross section required for the implementation of full load operation. Consequently, to achieve a desired duration for the fuel injection event for stable ignition during operation at lower loads, a fuel injection valve that is operable to modulate flow rate between zero and a maximum flow rate during an injection event is needed. Accordingly, a preferred fuel injection valve comprises an actuator that can be controlled to control movement of the valve needle, and consequently flow rate through the fuel injection ports. For example an injection valve that employs a piezoelectric or magnetostrictive actuator would be suitable for this purpose. Tests have shown that adjusting the time-behavior of the injection of the main fuel quantity by varying the stroke of the valve needle during the injection process can provide a means for controlling the characteristics of the combustion process.

Known actuators for fast operation of the fuel injection valve can be employed, such as hydraulic, electromagnetic, piezoelectric, and magnetostrictive actuators. For a hydraulically actuated fuel injection valve, an electromagnetic, piezoelectric, or magnetostrictive actuator can be used to operate the hydraulic valve that controls the flow of hydraulic fluid in and out of the fuel injection valve.

An electronic controller preferably controls actuation of the fuel injection valve using electronic map control, for fuel metering, adjusting timing for the start of injection, and controlling flow rate during an injection event.

The ignition fuel spray preferably has a free length of between about 3.5 and 8 millimeters. The free length is the distance between the fuel injection port that is aimed at the ignition device and the impingement point where the ignition fuel spray impinges upon the ignition device. The preferred free length corresponds to between 5% and 10% of the diameter of the piston bowl, with lower percentages within this range being generally associated with larger piston bowl diameters and higher percentages within this range being generally associated with smaller piston bowl diameters. In a preferred embodiment, the gaseous fuel injection pressure is kept at a constant pressure between 200 and 300 bar.

The intake opening can be one of a plurality of intake openings with each intake opening positioned near the impingement point so that at least some of the combustible gaseous fuel from the ignition fuel spray that impinges upon the ignition device flows through the plurality of intake openings and into the shielded space. In preferred embodiments the impingement point is equidistant from the center of each of the intake openings. When there are two intake openings, the impingement point can be the midpoint of a straight line drawn between the centers of each of the two intake openings.

The discharge opening can be one of a plurality of discharge openings. Each one of the discharge openings is spaced further from the impingement point than the spacing between the intake opening and the impingement point. Preferably, the size of each one of the plurality of discharge openings is determined by the combined flow area required to allow a desired flow through the plurality of discharge openings during full load operating conditions. In a preferred embodiment, the combined open area is between about 0.75 and 5.0 square millimeters.

In preferred embodiments, the sleeve can be equipped with between two and ten fuel passage openings, and more preferably with four to six openings. The number of openings is chosen as a function of the piston diameter, the combustion chamber diameter, the maximum crankshaft speed, and the general operating conditions.

In a preferred embodiment, the intake opening(s) and the discharge opening(s) are provided through the same lateral surface of the sleeve and their functionality is determined by their respective spacing from the impingement point where the ignition fuel spray is aimed.

The sleeve preferably has a closed end with the intake opening(s) and the discharge opening(s) being the only means for fluid communication between the combustion chamber and the shielded space.

In a preferred embodiment, there are two intake openings and two discharge openings and each opening is round and has a diameter that is no less than 1.0 millimeter and no more than 1.2 millimeters.

The effectiveness of the ignition device depends upon the sleeve being designed for a plurality of functions that are balanced against each other. On the one hand, the sleeve functions to shield the igniter from being fully exposed to the pulsating flows of the fuel-air mixture in the combustion chamber and the cooling effects of the intake charge and the gaseous fuel that are introduced into the combustion chamber. For this function, the sleeve is preferably closed-ended and surrounds the igniter to restrict flow between a shielded space around the igniter and the combustion chamber. On the other hand, for the ignition device to function, some fluid communication is needed between the combustion chamber and the shielded space so that a sufficient quantity of gaseous fuel can enter the shielded space to form a combustible fuel-air mixture that can be ignited by coming into contact with a hot surface of the igniter. For this function, the sleeve has at least one intake opening that allows fluid communication between the combustion chamber and the shielded space. The size and position of the intake opening(s) are selected so that the portion of the ignition fuel spray that enters into the shielded space through the intake opening(s) provides substantially all the fuel that is needed to initiate combustion within the shielded space and the combustion chamber. Accordingly, the ignition device is capable of igniting a combustible fuel-air mixture that forms within the shielded space and is designed to propel a burning fuel-air mixture into the combustion chamber. The discharge opening(s) provided through the sleeve allow a burning fuel-air mixture to exit the shielded space. Because the disclosed arrangement allows the needed amount of gaseous fuel to flow into the shielded space through the intake openings, the discharge opening(s) can be sized and oriented solely for directing a burning fuel-air mixture towards predetermined spaces within the combustion chamber to ignite the rest of the gaseous fuel. The total open area provided by the intake and discharge openings is very much less than the open area provided by previously known perforated or open-ended shields. Another benefit of the disclosed sleeve is that fluid flow between the combustion chamber and the shielded space is restricted for fluids entering and exiting the shielded space. That is, once a combustible fuel-air mixture forms within the shielded space and is ignited by contacting the hot surface of the igniter, pressure can build within the shielded space. Previously known shields, which have open ends or highly perforated sleeves, do not restrict flow back into the combustion chamber to the same degree. It is believed that a benefit of the present design is that it allows higher pressures to build, which helps to propel the burning fuel-air mixture through the discharge opening(s).

In preferred embodiments, the ignition device's discharge opening(s) are oriented to direct the burning fuel-air mixture towards the roots of the plurality of fuel sprays near the fuel injection ports of the fuel injection valve where a fuel-rich combustible mixture is provided.

As described above, the ignition fuel spray is at least one of a plurality of fuel sprays and the fuel sprays that are not aimed at the ignition device are oriented to distribute gaseous fuel uniformly within the rest of the combustion chamber to mix with the intake charge and form a combustible mixture. In preferred embodiments, the nozzle for the fuel injection valve can employ between four and twelve fuel injection ports, depending upon factors such as the diameter of the combustion chamber, the swirl-amplification of the fuel-air mixture formation that is required as a function of the maximum crankshaft speed, and of the general operating conditions. For example, more injection ports are normally preferred for larger combustion chambers.

Experiments have shown that the disclosed engine design, which combines an ignition device with an ignition spray of short free length, and a high compression ratio typical of self-igniting internal combustion engines (diesel engines), enables operationally dependable, reliable and low-emission operation of an internal combustion engine. Furthermore, in comparison to known configurations, an ignition device that comprises a sleeve disposed around an igniter to provide a shielded space next to the igniter can be employed to significantly reduce the heating power supplied to the igniter.

The igniter is preferably electrically heated, such as, by way of example, a glow plug. However, the glow plug should be designed for continuous operation under the operating conditions associated with the present engine. The igniter and/or the sleeve can comprise a ceramic surface. Furthermore, a combustion catalyst can be deposited on the igniter or sleeve to lower the operating temperature needed for stable combustion.

In a preferred arrangement, the gaseous fuel injection nozzle is aligned along the center of the combustion chamber recess. This centric arrangement results in a uniformly distributed injection of the gaseous fuel into the combustion chamber recess, and is conducive to a complete mixing with the air within the intake charge. Furthermore, the centric arrangement of the gaseous fuel injection nozzle makes it possible to design the cylinder head as a three-valve or four-valve cylinder head.

In a preferred method, an ignition quantity of fuel that represents 5% to 10% of the fuel quantity needed at full load is introduced into the combustion chamber in a first injection event. A second injection event is employed to inject a main quantity of fuel into the combustion chamber to supplement the ignition quantity of fuel to provide the amount of fuel required to satisfy the demanded engine load, as determined by the engine controller by referring to an engine map. This allows the timing for the first injection event to be governed by the desired ignition timing and the timing for the second injection event to be governed by timing that can result in improved combustion characteristics. For example, the two separate fuel injection events can be timed to provide more intensive and thus more stable ignition of the fuel-air mixture without an increase in the surface temperature of the igniter, a prerequisite for lower emissions of carbon monoxide and unburned fuel. In addition, because some of the fuel is introduced during the first injection event, this results in a smaller ignitable mixture volume at the time of the beginning of combustion, which leads to a lower heat release rate and thus less combustion noise.

For precise control the injection process and to ensure that the cylinders of the internal combustion engine follow the same combustion sequence, the engine can further comprise sensors and/or electronic controllers capable of detecting the time of injection. The preferred method can employ variable flow rates, achieved by controlling the stroke of the valve needle, independent of the operating point, by monitoring the movement of one or all of the valve needles.

On account of the high ignition reliability of the fuel-air mixture that is achievable with the disclosed ignition device, the engine's exhaust gas is particularly suitable for re-circulating a controlled amount back into the engine's air intake system, using what are known as techniques for exhaust gas recirculation ("EGR"). Accordingly, in a preferred embodiment the engine further comprises an EGR system for directing into an air intake system, a portion of the exhaust gas exhausted from the combustion chamber. The recirculated exhaust gas can be cooled or uncooled before being introduced into the air intake system, depending upon the engine's operating conditions. With the disclosed method, exhaust gas recirculation rates of up to 70% can be employed to reduce nitrogen oxide emissions.

BRIEF DESCRIPTION OF THE DRAWINGS

Further advantageous embodiments of the invention can be found in the description of the figures, which illustrates in more detail a preferred embodiment of the invention.

DETAILED DESCRIPTION

Figures 1, 2:
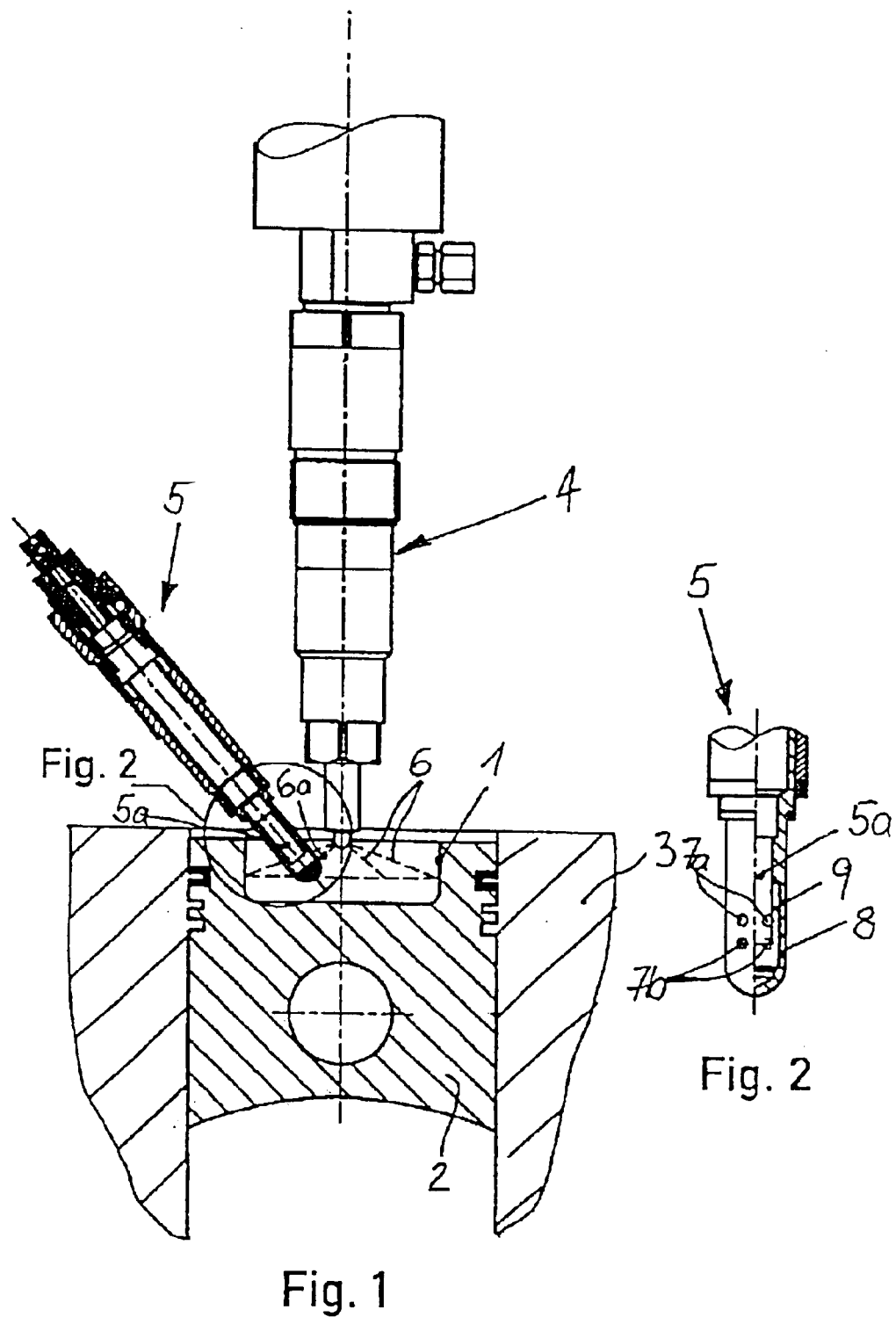
FIG. 1 shows a side view of the gaseous fuel injection nozzle and ignition device disposed within the combustion chamber.
FIG. 2 shows a detailed view of the ignition device of FIG. 1.

FIG. 1 is a partial cross-section of a gaseous-fueled internal combustion engine illustrating a preferred embodiment of a combustion chamber, which is defined by cylinder 10, piston 12, which is reciprocable within cylinder 10, and cylinder head 14, which covers the top end of cylinder 10. Fuel injection valve 20 and ignition device 30 are mounted in cylinder head 14 with respective tips that extend into the combustion chamber. This internal combustion engine can be of an inline- or V-design with any desired number of cylinders and displacement.

Piston 12 preferably is substantially the same as the piston employed in an equivalent diesel-fueled engine, and typically comprises chamber recess 13. A simple shape for chamber recess 13 is shown for illustrative purposes, but persons skilled in the technology will understand that other shapes can be employed. For example, smaller engines can use a re-entrant combustion chamber with a pip to promote turbulence for improved mixing. The rapid formation of a fuel-air mixture within the combustion chamber can also be supported by turbulence and swirl within the cylinder charge during a fuel injection event.

The tip of fuel injection valve 20 comprises a gaseous fuel injection nozzle with a plurality of fuel injection ports through which gaseous fuel is introduced directly into the combustion chamber. At least one of the fuel injection ports is aimed at an impingement point on ignition device 30. In the illustrated embodiment, fuel injection valve 20 is aligned with the centerline of combustion chamber recess 13 and preferably comprises between four and twelve fuel injection ports with fuel sprays 22 from such injection ports depicted in FIG. 1 by dashed lines. One of the fuel injection ports is aimed to direct fuel spray 22a at an impingement point on ignition device 30.

With reference to FIG. 2, ignition device 30 comprises igniter 32 and sleeve 34, which is disposed around igniter 32 to provide a shielded space between igniter 32 and the inner surface of sleeve 34. In the illustrated embodiment, the shielded space comprises an annular space between igniter 32 and the interior wall of sleeve 34 and the space between the free end of igniter 32 and the closed end of sleeve 34. Reference number 33 identifies the shielded space in FIG. 2. The impingement point is a point on the outer surface of sleeve 34 that is proximate to at least one intake opening 36 provided through sleeve 34. Intake opening 36 allows fluid communication between shielded space 33 and the combustion chamber. In the embodiment illustrated in FIG. 2 there are two intake openings 36. The open area and the position of intake opening(s) 36 relative to the impingement point are designed to allow an amount of gaseous fuel to enter shielded space 33 that is sufficient to ignite and cause ignition of substantially all of the gaseous fuel in the combustion chamber. Experiments have shown that the illustrated arrangement with two intake openings 36, each with a diameter of between 1 and 1.2 millimeters, can be effective. Computational fluid dynamic analysis can be used to further study intake opening size, position and number. It is presently understood that sizing intake opening 36 too small will not allow a sufficient quantity of fuel to enter shielded space 33, whereas sizing the intake opening too large can lead to excessive flow between shielded space 33 and the combustion chamber, which can cause excessive cooling of igniter 32 and reduce pressure build up within shielded space 33, causing slower or less extensive penetration of the burning fuel-air mixture that is propelled into the combustion chamber.

The position of ignition device 30 in cylinder head 14 is chosen so that the fuel spray introduced through the fuel injection port possesses a free spray length of between 3.5 millimeters and 8 millimeters, or 5% to 10% of the diameter of the combustion chamber recess depending upon the size of the combustion chamber. The amount of fuel introduced into the engine depends upon operating conditions such as load, and whether the load is static or dynamic (i.e. changing). Experimental results have shown that, under expected operating conditions, the above-stated spacing between the fuel injection port and the impingement point results in a sufficient quantity of gaseous fuel entering shielded space 33 to form a combustible fuel-air mixture that comes into contact with igniter 32. It is believed that fuel spray 22a entrains some air as it travels towards the impingement point, but that it also mixes with air that has flowed into shielded space 33 during the engine piston's intake and compression stroke. It is also believed that directing fuel spray 22a towards an impingement point, rather than being aimed directly at an intake opening results in improved mixing and reduced cooling effects.

When a combustible fuel-air mixture forms within shielded space 33, it contacts the hot surface of igniter 32, and is ignited, the pressure within shielded space 33 increases rapidly as a result of combustion and the restricted flow between shielded space 33 and the combustion chamber. This elevated pressure propels a burning fuel-air mixture into the combustion chamber through at least one discharge opening 38. In the embodiment illustrated in FIG. 2, there are two discharge openings 38.

Discharge opening(s) 38 are spaced apart from intake opening(s) 36 so that the discharge opening(s) can be oriented to aim the burning fuel-air mixture to other parts of the combustion chamber for efficient burning of the combustible fuel-air mixture that forms as a result of an injection event. In a preferred embodiment, discharge opening(s) 38 are aimed towards the roots of fuel sprays below the nozzle of fuel injection valve 20. Discharge opening(s) 38 are spaced further from the impingement point than intake opening(s) 36. Under preferred operating conditions, an injection event continues while the burning fuel-air mixture emerges from shielded space 33, and it is believed that the spacing of the discharge opening(s) from the impingement point reduces interference between the burning fuel-air mixture that emerges from ignition device 30 and fuel spray 22a that is directed towards ignition device 30. Reducing such interference can help to produce a very short ignition lag, which has a positive effect on the operating characteristics of the internal combustion engine. Compared to liquid fuels, a fuel injection event with a longer duration can be required to inject a gaseous fuel. Accordingly, the arrangement of the intake and discharge openings in relation to the impingement point is important because fuel injection valve 20 can continue to inject gaseous fuel into the combustion chamber after combustion is initiated because fuel spray 22a does not interfere significantly with the spread of the burning fuel-air mixture propelled through the discharge openings. A longer duration for a fuel injection event can be advantageous in some preferred embodiments, because then the burning fuel-air mixture can be aimed at the roots of fuel sprays that are being simultaneously injected into the combustion chamber. In such embodiments, when a single fuel injection event is employed in an engine cycle, the ignition lag can be shorter than the time duration of the corresponding injection event.

Another reason for spacing the discharge opening further from the impingement point is that this arrangement ensures that most of the fuel enters into shielded space 33 through intake opening(s) 36, allowing some air from within shielded space 33 to be displaced back into the combustion chamber through discharge opening(s) 38, thereby facilitating the entry of gaseous fuel into shielded space 33 through intake openings 36 at the beginning of the injection event. Accordingly, there are a number of advantages associated with the disclosed arrangement with at least one intake opening and at least one discharge opening, with the function of these openings determined by the respective spacing between the impingement point and the intake and discharge openings. As shown in the embodiment illustrated by FIG. 2, discharge openings 38 are positioned below the intake openings 36. In this illustrated embodiment, the impingement point is preferably equi-distant from intake openings 36 and could be the mid-point between them or another location along the center axis of ignition device 30 that is closer to intake openings 36 than to discharge openings 38.

Gaseous fuel injection valve 20 can be a hydraulically actuated valve, with the hydraulic pressure being controlled by an electromagnetic hydraulic valve. To implement pre-injection and division of the main injection into several injection steps or "pulses", it is possible to use a hydraulically switched valve driven by a piezoelectric actuator, since such a valve possesses a sufficiently high switching frequency. Tests have shown that a hydraulically activated valve driven by a piezoelectric actuator in combination with the hydraulic operation of the gaseous fuel valve meets the requirements for switching frequency and accuracy for controlling the beginning and duration of injection.

In another embodiment, a gaseous fuel injection valve that employs a needle that is directly actuated by an electromagnetic actuator can be employed. In such a fuel injection valve hydraulic actuation fluid is not needed and the movement of the armature of the electromagnetic actuator causes a corresponding movement of the needle to open and close the fuel injection valve. A fuel injection valve with such an electromagnetic actuator can provide the necessary speed for allowing injection events with short pulse widths and more than one injection event in a single engine cycle.

In still other preferred embodiments, fuel injection valve 20 can be "directly" actuated by a piezoelectric or magnetostrictive actuator that provides the motive force for displacing a valve member to open and close fuel injection valve 20. Such actuators can be operated with even shorter fuel injection pulse widths and can be suitable for engines that are designed to operate at higher crankshaft speeds. A further advantage of using a directly actuated injection valve is that in addition to providing the requisite speed for multiple injection pulses during a single engine cycle, piezoelectric and magnetostrictive actuators can also be controlled to enable "rate shaping" which means that the degree of displacement caused by the actuator during an injection pulse can be controlled to adjust flow rate through the fuel injection valve during a fuel injection pulse.

Ignition device 30, shown in FIGS. 1 and 2 can employ an igniter 32 with a ceramic surface, because ceramic materials can be fabricated with the durability needed for the harsh conditions under which the ignition device operates. To further improve the stability of ignition device 30, the shielding sleeve 34 can also be a ceramic material. A catalytic coating can also be provided on sleeve 34, comprising platinum and/or palladium to accelerate the ignition process for improved combustion stability. The use of such a catalytic coating is especially advantageous for smaller engines, because the size of the combustion chamber normally dictates a shielded space with a smaller volume, leading to a smaller fuel volume being ignited at the hot surface; in such an engine, an ignition device without a catalytic coating could result in slower combustion and correspondingly higher hydrocarbon and carbon monoxide emissions.

Figure 3:
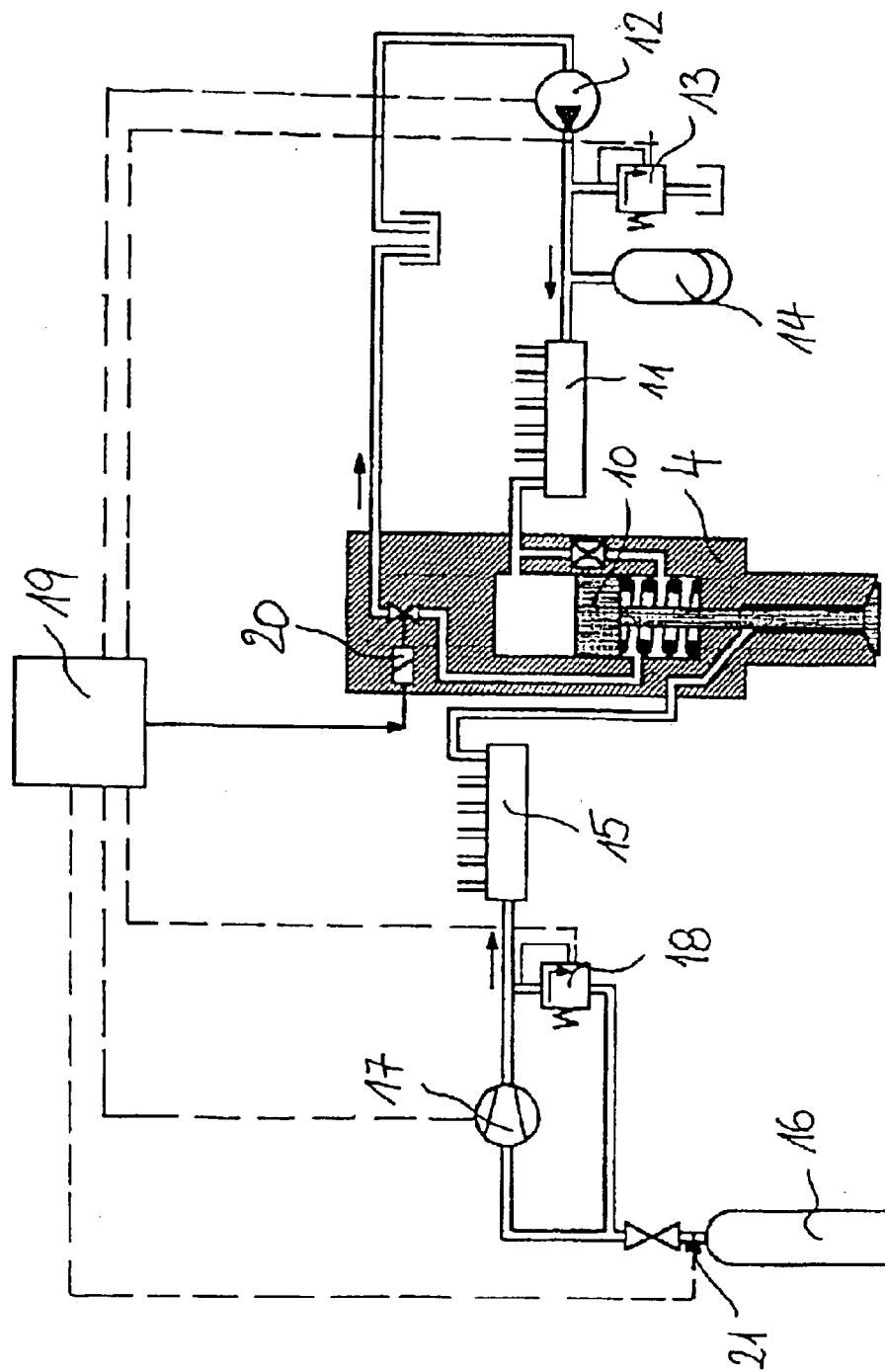
FIG. 3 shows an overall schematic diagram of the fuel and hydraulic systems associated with the gaseous fuel injection valve, and the controller for these systems.

The method of operating an internal combustion engine with gaseous fuel being directly injected into the combustion chamber requires a constant high fuel pressure upstream of gaseous fuel injection valve 20. If the engine is to be used in a vehicle, it is necessary to provide an on-board high-pressure fuel supply system. FIG. 3 shows one embodiment of such a fuel system with devices for supplying a gaseous fuel and for providing hydraulic fluid for operating gaseous fuel injection valve 120. Gaseous fuel injection valve 120 is operable by hydraulic fluid pressure, which acts upon piston 122. Piston 122 is associated with valve needle 124 whereby movement of piston 122 causes a corresponding movement of valve needle 124.

In a multi-cylinder internal combustion engine, a gaseous fuel injection valve is provided for each combustion chamber and common hydraulic fluid supply line 140 supplies hydraulic fluid to each one of the fuel injection valves. Hydraulic pump 142 preferably generates a pressure of 250 to 300 bar. The pressure within hydraulic fluid supply line 140 is controlled by pressure control valve 144, and pressure accumulator 146 is filled to maintain hydraulic pressure, even after the engine has been turned off.

On the fuel side, and continuing with the example of a multi-cylinder engine as suggested in FIG. 3, gaseous fuel injection valve 120 is supplied with a gaseous fuel pressure of 200 bar through a common fuel supply line 150 that supplies fuel to each one of the gaseous fuel injection valves. The gaseous fuel is stored in fuel storage tank 152 and supplied to the fuel supply system at a pressure corresponding to the amount of gaseous fuel remaining therein. When fuel storage tank 152 is filled to maximum capacity, the pressure of the fuel delivered to the fuel supply system will be high, and as the tank is emptied, pressure within fuel storage tank 152 decreases. If gaseous fuel storage tank 152 is fully charged, for example, with a pressure of 200 bar, then controller 160 determines this from pressure transducer 162 and controller 160 considers engine operating conditions when controlling compressor 154 and pressure control device 156 to supply the needed amount of gaseous fuel to the injection valves at the desired pressure. As more gaseous fuel is removed, and the pressure is correspondingly lower, as detected by pressure transducer 162, and controller 160 takes this into account when controlling compressor 154 and pressure control device 156.

Controller 160 can also be programmed and wired to control the hydraulic fluid pressure in the hydraulic system by controlling hydraulic pump 142 and pressure control valve 144, and the actuation of fuel injection valve 120 and the other fuel injection valves in a multi-cylinder engine. In the illustrated embodiment, controller 160 is wired to control solenoid valve 128 by opening or closing the hydraulic fluid drain line. When controller 160 opens control solenoid valve 128 hydraulic fluid is drained from spring chamber 127 within injection valve 120, and the pressure of the hydraulic fluid in control chamber 126 (above spring chamber 127) acts to push piston 122 downwards, whereby valve needle 124 also moves downwards to open fuel injection valve 120 and inject fuel into the combustion chamber. The illustrated fuel injection valve has an outward opening needle, and those skilled in the technology will understand that an inward opening needle is also suitable, and in either case, the nozzle of the fuel injection valve is preferably provided with features for directing fuel sprays into the combustion chamber and aiming one of the fuel sprays towards an impingement point on the ignition device.

While particular elements and embodiments of the present invention have been shown and described, it will be understood, of course, that the invention is not limited thereto since modifications may be made by those skilled in the art without departing from the scope of the present disclosure, particularly in light of the foregoing teachings.

By way of example, a liquefied gaseous fuel supply system comprising a cryogenic storage tank, a fuel pump, a vaporizer, and associated pressure control devices could be substituted for the compressed gaseous fuel supply system shown in FIG. 3.

What is claimed is:

1. An internal combustion engine fueled with a combustible gaseous fuel, said engine comprising:

at least one combustion chamber defined by a cylinder, a piston reciprocable within said cylinder, and a cylinder head that covers an end of said cylinder;

an ignition device with an end disposed within said combustion chamber, said ignition device comprising an igniter that is heatable to provide a hot surface and a sleeve surrounding said igniter, said sleeve defining a shielded space between said igniter and said sleeve;

a fuel injection valve disposed within said combustion chamber, said fuel injection valve being operable to introduce said combustible gaseous fuel into said combustion chamber with a plurality of fuel sprays each released from one of a plurality of fuel injection ports, wherein one of said plurality of fuel injection ports is oriented to direct a fuel spray, referred to as an ignition fuel spray, towards an impingement point on said sleeve;

an intake opening provided through said sleeve near said impingement point connecting said shielded space to said combustion chamber whereby, when said ignition fuel spray impacts said impingement point, a portion of said combustible gaseous fuel contained within said ignition fuel spray passes through said intake opening and into said shielded space;

a discharge opening provided through said sleeve, spaced further from said impingement point than said intake opening, wherein said discharge opening is oriented to direct a burning fuel-air mixture from said shielded space and towards roots of said plurality of fuel sprays near said fuel injection valve; and wherein said sleeve restricts flow between said shielded space and said combustion chamber so that a substantial portion of said combustible gaseous fuel is retained within said shielded space until combustion of said combustible gaseous fuel within said shielded space produces a pressure therein that is higher than the pressure within the combustion chamber and said pressure is high enough to propel said burning fuel-air mixture into said combustion chamber and into contact with said roots of said plurality of the fuel sprays.

2. The internal combustion engine of claim 1 wherein said engine is operable with a compression ratio up to 25:1.

3. The internal combustion engine of claim 2 wherein said engine is operable with a variable compression ratio.

4. The internal combustion engine of claim 1 wherein said engine is operable with a compression ratio between 13:1 and 25:1.

5. The internal combustion engine of claim 1 wherein said intake opening and said discharge opening are provided through the same lateral surface of said sleeve.

6. The internal combustion engine of claim 1 wherein said sleeve has a closed end with said intake opening and said discharge opening being the only means for fluid communications between said combustion chamber and said shielded space.

7. The internal combustion engine of claim 1 wherein said intake opening is one of a plurality of intake openings provided through said sleeve and each intake opening is located near said impingement point so that a portion of said combustible gaseous fuel contained within said ignition fuel spray enters said shielded space through said plurality of intake openings.

8. The internal combustion engine of claim 7 wherein there are two intake openings.

9. The internal combustion engine of claim 8 wherein said impingement point is equidistant from the center of each of said two intake openings.

10. The internal combustion engine of claim 8 wherein said impingement point is the midpoint of a straight line drawn between the centers of each of said two intake openings.

11. The internal combustion engine of claim 10 wherein said discharge opening is one of two discharge openings provided through said sleeve.

12. The internal combustion engine of claim 11 wherein each one of said intake openings and said discharge openings is round and has a diameter no less than 1.0 millimeter and no more than 1.2 millimeters.

13. The internal combustion engine of claim 8 wherein said two intake openings are the same distance from said end of said ignition device.

14. The internal combustion engine of claim 1 wherein said discharge opening is one of a plurality of discharge openings provided through said sleeve.

15. The internal combustion engine of claim 14 wherein the size of each one of said plurality of discharge openings is determined by the combined open area required to allow a desired flow through said plurality of discharge openings during full load operating conditions.

16. The internal combustion engine of claim 15 wherein the combined open area of said intake and discharge openings is between about 0.75 and 5.0 square millimeters.

17. The internal combustion engine of claim 1 wherein said igniter is electrically heated.

18. The internal combustion engine of claim 17 wherein said igniter is a glow plug.

19. The internal combustion engine of claim 17 wherein said igniter has a ceramic surface.

20. The internal combustion engine of claim 17 wherein said igniter is catalytically coated.

21. The internal combustion engine of claim 1 wherein said sleeve is made from a ceramic material.

22. The internal combustion engine of claim 1 wherein said sleeve is coated with a catalytic coating for promoting reactions involving said combustible gaseous fuel and air to introduce reaction products into said shielded space that promote ignition at a lower surface temperature.

23. The internal combustion engine of claim 1 wherein said piston further comprises a recess that further defines the geometry of said combustion chamber.

24. The internal combustion engine of claim 23 wherein said fuel injection valve is mounted in said cylinder head and aligned with the centre of said recess.

25. The internal combustion engine of claim 24 wherein said ignition device is mounted in said cylinder head.

26. The internal combustion engine of claim 25 wherein the distance between said impingement point and said fuel injection port associated with said ignition fuel spray is between 5% and 10% of the diameter of said recess.

27. The internal combustion engine of claim 1 wherein said fuel injection valve and said ignition device are each mounted in said cylinder head.

28. The internal combustion engine of claim 27 wherein the distance between said impingement point and said fuel injection port associated with said ignition fuel spray is between 3.5 millimeters and 8 millimeters.

29. The internal combustion engine of claim 1 wherein said fuel injection valve is operable to provide a plurality of individual injection events during a single combustion cycle.

30. The internal combustion engine of claim 1 wherein the size of said discharge opening is determined by the open area required to allow a desired flow through said discharge opening during full load operating conditions.

31. The internal combustion engine of claim 1 wherein said fuel injection valve is operable to modulate flow rate between zero and a maximum flow rate during an injection event.

32. The internal combustion engine of claim 31 wherein flow rate through said fuel injection valve is controllable by controlling the movement of a needle within said fuel injection valve.

33. The internal combustion engine of claim 1 further comprising an exhaust gas recirculation system for directing into an air intake system, a portion of the exhaust gas exhausted from said combustion chamber.

34. The internal combustion engine of claim 33 wherein said portion of the exhaust is cooled prior to being directed into said air intake system, depending upon measured engine operating conditions.

35. The internal combustion engine of claim 1 wherein said fuel injection valve comprises between four and twelve fuel injection ports.

36. The internal combustion engine of claim 1 wherein said fuel injection valve is switched electromagnetically and hydraulically driven.

37. The internal combustion engine of claim 1 wherein said fuel injection valve is hydraulically driven using a hydraulic valve with a piezoelectric actuator.

38. The internal combustion engine of claim 1 wherein said fuel injection valve is electronically controlled and directly driven by an electromagnetic actuator.

39. The internal combustion engine of claim 1 wherein said fuel injection valve is electronically controlled and driven by a piezoelectric or magnetostrictive actuator.

40. A method of operating a gaseous-fueled internal combustion engine comprising at least one combustion chamber defined by a cylinder, a piston reciprocable within said cylinder, and a cylinder head that covers an end of said cylinder, said method comprising:
  introducing a gaseous fuel into said combustion chamber by means of a plurality of fuel sprays released into said combustion chamber from a fuel injection valve disposed within said combustion chamber;
  directing one of said fuel sprays to an impingement point on a sleeve that surrounds an igniter so that a portion of said gaseous fuel flows through an intake opening provided in said sleeve, whereby said gaseous fuel mixes with air in a shielded space provided between said igniter and said sleeve to form a combustible fuel-air mixture next to said igniter;
  igniting said combustible fuel-air mixture by heating a surface of said igniter to a temperature that causes ignition of said combustible fuel-air mixture; and
  restricting fluid flow between said combustion chamber and said shielded space and retaining a substantial portion of said combustible fuel-air mixture within said shielded space until combustion of same increases pressure within said shielded space to a magnitude that propels a burning fuel-air mixture therefrom through at least one discharge opening and into contact with roots of said plurality of fuel sprays in said combustion chamber near said fuel injection valve.

41. The method of claim 40 further comprising spacing said discharge opening a distance from said impingement point that is greater than the distance between said intake opening and said impingement point.

42. The method of claim 41 wherein said distance between said discharge opening and said impingement point provides spacing so that interference from said fuel spray that is directed at said impingement point does not prevent said burning combustible fuel-air mixture from being propelled into contact with said roots of said plurality of fuel sprays near said fuel injection valve.

43. The method of claim 40 further comprising injecting said gaseous fuel into said combustion chamber at a first flow rate when said engine is operating at low load or idle, and injecting said gaseous fuel into said combustion chamber at a second flow rate when said engine is operating at high load, wherein said second flow rate is higher than said first flow rate.

44. The method of claim 40 further comprising controlling the flow rate for injecting a desired quantity of said gaseous fuel into said combustion chamber so that the duration of an injection event is longer than an ignition delay associated with the ignition of said gaseous fuel that was directed towards said ignition device at the beginning of said injection event.

45. The method of claim 40 further comprising controlling injection timing and injection event duration as a function of measured engine operating conditions and by referring to an electronic engine map.

46. The method of claim 40 further comprising introducing said gaseous fuel into said combustion chamber in a plurality of injection events during a single engine cycle.

47. The method of claim 46 wherein a first injection event is employed to introduce a first quantity of said gaseous fuel into said combustion chamber to be ignited by said ignition device, followed by at least one other injection event to introduce a second quantity of said gaseous fuel, wherein said first and second quantities of fuel together provide a total quantity of fuel that is equal to an amount determined by an engine controller, with reference to an engine map, and said first quantity of fuel is determined by said engine controller to be a quantity that is sufficient to ensure that said second quantity of fuel is ignited.

48. The method of claim 47 wherein said first quantity of said gaseous fuel is no more than 10% by mass of said total quantity of fuel when said engine is operated at full load.

49. The method of claim 47 wherein said first quantity of said gaseous fuel is between 5% and 10% by mass of said total quantity of fuel when said engine is operated at full load.

50. The method of claim 47 wherein said second quantity of fuel is divided between a plurality of fuel injection events.

51. The method of claim 40 further comprising electrically heating said igniter to have a surface temperature that is hot enough to ignite said combustible fuel-air mixture.

52. The method of claim 51 further comprising controlling the temperature of said igniter as a function of a measured operating parameter of said engine.

53. The method of claim 40 further comprising catalytically coating said igniter.

54. The method of claim 40 further comprising catalytically coating said sleeve.

55. The method of claim 40 wherein said intake opening is one of a plurality of intake openings.

56. The method of claim 55 wherein each one of said plurality of intake openings is equidistant from said impingement point.

57. The method of claim 40 wherein said discharge opening is one of a plurality of discharge openings.

58. The method of claim 57 wherein the size of said discharge openings is determined by the size needed to accommodate the desired flow through said discharge openings when said engine is operating at full load.

59. The method of claim 40 wherein said igniter comprises a ceramic surface.

60. The method of claim 40 further comprising aligning said fuel injection valve with the central axis of said combustion chamber.

61. The method of claim 40 further directing a portion of the exhaust gas exhausted from said engine into an air intake system.

62. The method of claim 61 further comprising controlling the amount of said portion of the exhaust gas that is directed into said air intake system depending upon measured operating conditions.

63. The method of claim 62 further comprising cooling said portion of the exhaust gas that is directed into said air intake system depending upon measured operating conditions.

64. The method of claim 63 further comprising controlling the amount of said portion of the exhaust gas depending upon measured operating conditions.

65. The method of claim 40 wherein said fuel spray that is directed towards said impingement point travels a distance of between 3.5 millimeters and 8 millimeters from said fuel injection valve to said impingement point.

66. The method of claim 40 further comprising changing the compression ratio within said combustion chamber so that when said engine is operating with a predetermined low load a first compression ratio is employed, and when said engine is operating with a predetermined high load, which is higher than said predetermined low load, a second compression ratio is employed, and wherein said second compression ratio is lower than said first compression ratio.

* * * * *